C. W. MIEGEL.
TIRE CASING.
APPLICATION FILED DEC. 29, 1915.
1,293,158. Patented Feb. 4, 1919.
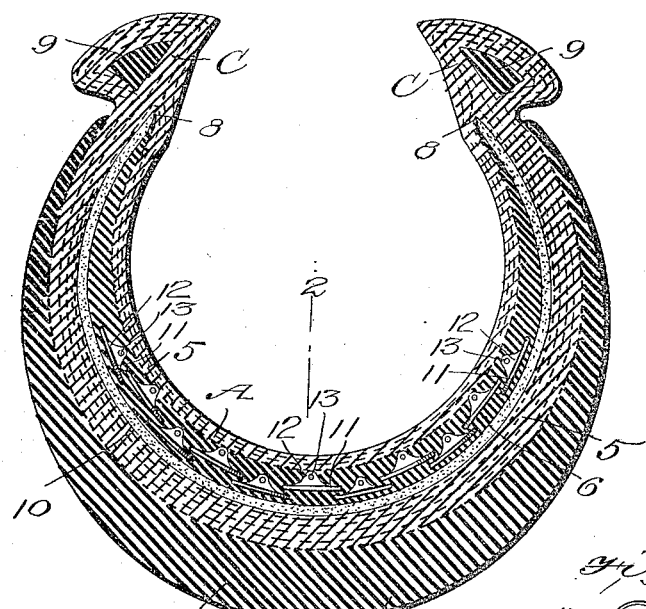
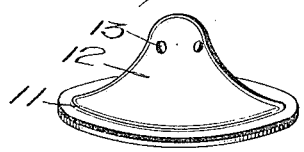
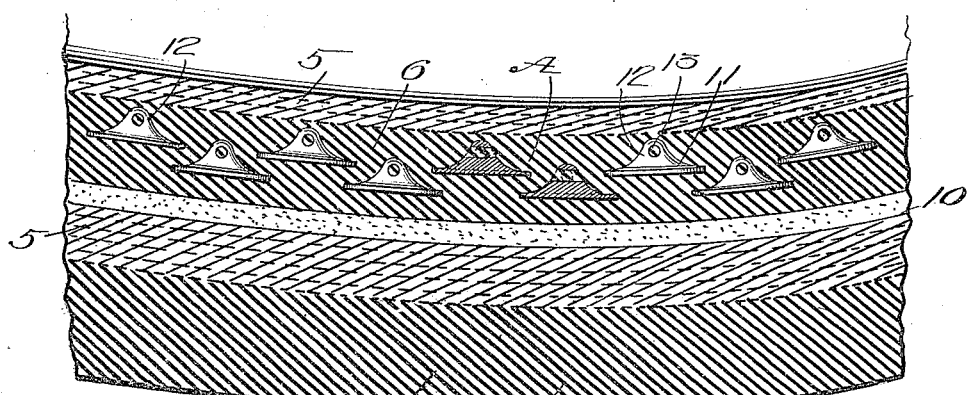
WITNESSES:
INVENTOR
Charles W. Miegel
BY Munn & Co.
ATTORNEYS

UNITED STATES PATENT OFFICE.

CHARLES WILLIAM MIEGEL, OF JERSEY CITY, NEW JERSEY.

TIRE-CASING.

1,293,158. Specification of Letters Patent. Patented Feb. 4, 1919.

Application filed December 29, 1915. Serial No. 69,163.

*To all whom it may concern:*

Be it known that I, CHARLES W. MIEGEL, a citizen of the United States, and a resident of Jersey City, in the county of Hudson and State of New Jersey, have invented a certain new and useful Improvement in Tire-Casings, of which the following is a specification.

One of the principal objects of my invention is to provide an improved tire casing having superior qualities of puncture and blow-out resistance and heat minimization.

Another object of the invention is the provision of a tire casing having the characteristics named above, in the nature of a double casing formed of inner and outer sections or members disconnected, except along lines adjacent the base of the casing where they merge to form the clencher beads, whereby to define a space between the sections in which powdered graphite or other dry lubricant is received.

A still further object resides in the provision of improved armor means for the casing.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a view in section taken vertically and transversely through a tire constructed according to my invention.

Fig. 2 represents a detail view in section taken vertically and longitudinally of the casing on the plane indicated by the line 2—2 of Fig. 1.

Fig. 3 represents a view in perspective of one of the armor disks.

In carrying out my invention, I provide a casing consisting essentially of the inner section A, outer section B, and the clencher beads C. Each of the sections consists of a fabric base or lining 5 embedded within the resilient rubber body portion 6 of the section. The sections are separated circumferentially and transversely, except along lines at 8 where they merge to form the clencher beads C. The clencher beads are provided with hard rubber cores 9 around which the fabric strips of the inner and outer casing sections extend.

Defined between these casing sections is a space at 10 which is filled with powdered graphite or other dry lubricant. The construction whereby the casings are built one inside of the other and are separated one from the other along their tread portions, adds strength and puncture resisting ability. Should the outer casing be punctured, the resilient strong inner casing blanketing the opening in the outer casing, will confine the inner tube and prevent it from blowing out. The layer of graphite between the casing sections, will minimize the friction and prevent overheating of the tire.

I provide an armor preferably arranged in the inner casing section. This armor consists of circumferentially and transversely extending spaced rows of metallic disks 11 occurring in layers one above the other. The arrangement is such that the spaces occurring between the disks in one layer are backed by the disks in the other layer, so that any sharp objects which would penetrate the outer section would be caught against one or more of the disks and its course deflected or its passage through the casing entirely stopped. Each of the disks is provided with a bell-shaped raised portion or knob 12 provided near its apex with a plurality of openings 13 extending therethrough, in and through which openings the rubber within which the disks are embedded, penetrates as the section is being molded, whereby the disks are properly anchored in place.

Such a tire casing as I have provided will afford advantages in avoidance of punctures, blow-outs and overheating and in increase of mileage, not incident to the casings of ordinary construction.

Although I have described the preferred embodiment of my invention, I may desire to make such changes in the construction, combination, and arrangement of parts thereof, as do not depart from the spirit of the invention, and the scope of the appended claim.

I claim:—

A tire casing including an outer road engaging section, a separate inner section spaced from the outer road engaging section and defining a chamber between the sections, the inner section being connected to the outer section only along its lateral margins, each of the sections including a rubber body portion having a fabric base embedded therein, an anti-friction and heat resisting material placed between the sections, and puncture and blow-out preventing means embedded directly in the material of the body of the inner section.

CHARLES WILLIAM MIEGEL.

Copies of this patent may be obtained for five cents each, by addressing the "Commissioner of Patents, Washington, D. C."